UNITED STATES PATENT OFFICE 2,603,614

FLAMEPROOFING

Morris L. Nielsen and Howard K. Nason, Dayton, Ohio, assignors to Monsanto Chemical Company, St. Louis, Mo., a corporation of Delaware No Drawing. Application December 30, 1949, Serial No. 136,137

7 Claims. (Cl. 260—30.6)

This invention relates to new compositions of matter, and the manner of producing them. The invention specifically relates to materials having utility in flameproofing compositions with the particular objective of reducing the usual difficulty in regard to the problem of after-glow.

It is an object of the invention to provide a composition of matter which may be applied to combustible products to reduce the danger of after-glow which is known to be a property common to resinous materials. The invention likewise relates to a preferred method for producing these compositions.

In accordance with the terminology which has developed in this field, "flameproofing" means the treatment of a material so that it is resistant to the propagation of flame across its surface after the igniting flame has been removed; that is, a properly flameproofed material will not support combustion independently of an external source of heat. In contact with an open flame, however, or at elevated temperatures, flameproofed organic material can be expected to char and decompose.

The technical term "flameproofing" is used herein according to the definitions and requirements set forth in the ASTM Standards 1944 Yearbook under Test (D626-41T) BS III, 1930, and also the Army Quartermaster Corps Test JQD 242.

In some flameproofing treatments, specifically those employing metallic oxides, there is an undesirable secondary reaction commonly known as "after-glow," by which is meant the flameless combustion that may occur in a treated material such as a fabric, after the igniting flame has been removed from the material. This phenomenon on cellulosic fabrics has also been described as a "catalytic incandescent oxidation of the carbon remaining after the initial catalytic pyrogenic decomposition of the cellulose." Thus, the metal oxides that are instrumental in bringing about the desirable suppression of the initial pyrogenic decomposition in many cases are primarily responsible for the production of an undesirable after-glow or "flameless combustion."

In the problem of reducing the danger of fire in the use of various resins, particularly in the case of resins which do not contain nitrogen, it is obvious that the large proportion of carbon, hydrogen and oxygen which are present in such resins, renders these materials particularly susceptible to combustion. Even such resinous materials as the phenolic resin class of materials have been found to glow excessively after they have been in contact with a flame, so that such a slow combustion or after-glow may entirely consume the resinous material, even where only a portion thereof had actually been consumed by flaming combustion. Such effects are particularly dangerous in coating compositions or other extended or dispersed surfaces of large area, which may by this means propagate a fire even though it may appear to have been extinguished at one point, since the after-glow phenomenon may permit the fire to be propagated to other portions of the coating film, where other combustible materials may cause flaming combustion to again take place. It is known that metallic oxides, such as antimony oxide which have been utilized in some flameproofing treatments, such as in combination with polyvinyl chloride or chlorinated paraffin, aid in the catalytic effect which appears to be the cause of the "after-glow" phenomenon. For this reason a flameless combustion may occur even in a treated material after the igniting flame has been removed from the said material.

The present invention provides compositions which reduce the after-glow in combustible materials such as resins, particularly the group of phenol-formaldehyde and resorcinol-formaldehyde resins.

The present invention provides compositions which may be applied to reduce the after-glow in combustible materials such as cellulosic products including cotton and also regenerated cellulose. The process of the invention may be carried out to obtain flameproofed products which avoid the prior art difficulty of after-glowing.

It has been found that flameproofing compositions employed in combination with a combustible base material such as a cotton fabric may be made with a negligible after-glow period if such combinations include phenolic resins in combination with the reaction product of melamine and phosphorus pentoxide. The preparation of this latter material is described in copending patent application, Serial No. 43,956, filed August 12, 1948, and assigned to the same assignee as is the present case.

It has been found that the phenolic resins in combination with the complex addition product of melamine and phosphorus pentoxide may also be employed in conventional fireproofing compositions as a specific ingredient to accomplish the objective of eliminating the danger of after-glow.

The composition of matter employed in the present application as an essential component for use with phenolic resins may be prepared by the reaction of melamine and phosphorus pentoxide to form a water-insoluble complex. It has been found that from two to four moles of melamine may be used for each mole of phosphorus pentoxide, while a preferred ratio consists of three moles of melamine to one mole of phosphorus pentoxide. Mixtures of these two ingredients may be formed and the mixtures may then be fused by heating to a temperature of about 400° C. The complex of melamine and phosphorus pentoxide so obtained is not a phosphate, as is shown by X-ray diffraction measurements, which also show that the product is an amorphous rather than a crystalline material. The proportion of the phenolic material may be varied widely, a preferred range being from 3% to 90% by weight of the above complex relative to the phenolic component.

The reaction product from the heating of melamine and phosphorus pentoxide is a white, infusible mass, which may be ground to a fine powder for use with phenolic resins in glow-proofing applications.

If desired, the dry powder may be suspended in water with the aid of dispersing agents and the suspension applied to fibrous materials in known manner. The melamine-phosphorus pantoxide apparently adheres to or is adsorbed by the base material to be treated, thereby reducing the burning tendency of the combustible base material and also the after-burning effect common to untreated materials.

Illustrative of the combination of the phenolic resins and the melamine-$P_2O_5$ complex with cellulosic materials, but not limitative of the scope of the invention, the following example shows an embodiment thereof:

*Example 1*

A sample of the melamine-$P_2O_5$ reaction product prepared as above was ground to pass a 325 mesh screen. The dry powder thus obtained was mixed with an equal amount of a phenol-formaldehyde resin and was dusted on a piece of cotton goods, so that approximately 15% by weight of the mixture was applied. Upon testing the so-treated cotton it was found that the flammability of the cotton was greatly reduced and the char did not exhibit any after-glow. As little as 5% by weight is effective in inhibiting the after-glow. The degree of subdivision may be varied in accordance with the desired add-on or method of application. Generally the compound should be ground to pass a 170 mesh screen or finer.

Loose cotton fibers, such as batting, wood or plant fibers, such as bagasse in various forms, paper and paper products may be similarly treated with good results. The application of the phenolic resin in combination with the melamine-$P_2O_5$ complex to the base material may be made by a dry method of by applying a slurry of the complex dispersed in a liquid.

The use of the phenolic resin in combination with the melamine-phosphorus pentoxide complex as a glow-proofing agent in the usual flame-proofing and fire-proofing compositions is contemplated in the present invention. It has been found that the use of this new composition solves the prior art difficulty of glowproofing. It has, for example, been previously suggested that compounds of zinc and boron, such as zinc borate may be utilized in combination with antimony oxide for the purpose of preventing after-glow, but I have found in the present investigation that the problem of reducing after-glow may be solved in a more efficient manner by the use of the melamine-phosphorus pentoxide complex.

The combination products based upon the phenolic resin in association with the reaction product of melamine and phosphorus pentoxide are materials which may be utilized in producing sheets of resinous or plastic materials, or in the manufacture of formed, plastic articles of various types such as may be produced by molding, extrusion, casting, stamping and other processes.

The composition of matter employed in the present application may be prepared by the dispersion or mixing of the melamine-$P_2O_5$ in the phenolic condensation product while in the liquid or paste form. However, it may also be mixed with the resin while the latter is in the form of powder or granules.

It has been found that when such combinations are subjected to a flame, a chemical reaction occurs, with the result that the flammability characteristic of the otherwise combustible resin is greatly reduced, and that the phosphorus compound which is initially infusible and insoluble aids in extinguishing fire and furthermore entirely eliminates any tendency to after-glow.

Illustrative of the combination of the resinous materials, together with the reaction product of melamine and phosphorus pentoxide without, however, being limitative of the scope of the invention, the following examples further illustrate the invention.

*Example 2*

A suspension was prepared from a heat-reactive condensation product of resorcinol and formaldehyde in the form of a paste. Such materials, as well as the phenolic resins generally, as contemplated in the present invention are described in C. Ellis, Chemistry of Synthetic Resins, pages 371–373 (Reinhold Publishing Company (1933)). One hundred parts of the condensation product were mixed with 5 parts of the melamine-phosphorus pentoxide reaction product. The combination was applied as a coating to metal panels and dried. These test panels, when subjected to a flame test similar to that shown by R. W. Little in Flameproofing Textile Fabrics, pages 111–115 (Reinhold Publishing Company (1947)), gave no after-flame or after-glow.

*Example 3*

A phenol-formaldehyde molding powder of a type shown in Ellis, at pages 277–290 was mixed with 30%, by weight, of the reaction product of melamine and phosphorus pentoxide. The mixture may be molded or formed into any desired shape to give resinous products which do not burn and which do not permit any after-glow or smoldering.

*Example 4*

The combination mixture of Example 3 was dispersed on glass fibers of small diameter and the treated material formed into a block for use as a heat-insulating material. This material, when subjected to a flame, did not burn, and did not exhibit any after-glow. A control sample of phenol-formaldehyde on glass fibers, identical but for the absence of the reaction product of melamine and phosphorus pentoxide, showed a prolonged glowing period after removal from a test flame. Glass fibers treated in the manner of the present example, such as by the use of from 3% to 50%, by weight, of the phenolic resin combination with the melamine-phosphorus pentoxide, have also been found to be useful as air filters which do not burn and will not glow after a contact with a flame. Other siliceous materials, particularly in attenuated form, such as fibrous silica, mineral wood, and cellular glass, may also be bonded to give a glowproof product by means of the present combination of a phenolic condensation product, together with a condensation product of melamine-$P_2O_5$ as set forth above.

The proportion of the phosphorus compound in association with the phenolic resin may be varied over a wide range, depending upon the degree of fire-retarding and glowproofing effects desired. It has been found, however, that the essential composition consisting of the phenolic resin, such as phenol-formaldehyde, resorcinol-formaldehyde and mixtures of the same, and the melamine-$P_2O_5$ reaction product should contain at least 3 parts, and preferably not more than 90 parts, by weight, of said melamine-phosphorus pentoxide condensation products per 100 parts by weight of the final mixture.

This application contains subject matter in common with certain other applications assigned to the same assignee as is the present application: Serial Nos. 43,955 and 43,956 (now U. S. Patent 2,544,706), filed August 12, 1948, the former relating to a method of glowproofing by the application of the complex composition resulting from the reaction of melamine and phosphorus pentoxide. The latter application relates to the preparation of the complex composition resulting from the reaction of melamine and phosphorus pentoxide.

Having now described certain specific forms of the invention, it is to be understood that the invention is not to be limited to the specific forms of compositions herein described or specifically covered by the claims.

What is claimed and is desired to be protected by Letters Patent of the United States is:

1. A glowproofing composition comprising the combination of a phenolic resin and the reaction product of 2 to 4 moles of melamine and 1 mole of phosphorus pentoxide heated to a temperature of about 400° C., said reaction product being present to the extent of 3% to 90% by weight in said composition.

2. A glowproofing composition comprising the combination of a resorcinol-formaldehyde resin and the reaction product of 2 to 4 moles of melamine and 1 mole of phosphorus pentoxide heated to a temperature of about 400° C., which latter reaction product is present to the extent of 3% to 90% by weight in said composition.

3. A glowproofing composition comprising the combination of a phenol-formaldehyde resin and the reaction product of 2 to 4 moles of melamine and 1 mole of phosphorus pentoxide heated to a temperature of about 400° C., which latter reaction product is present to the extent of 3% to 90% by weight in said composition.

4. The method of producing a glowproof, non-combustible material which comprises treating said material with a dispersion containing the insoluble, heat-reacton product of 2 to 4 moles of melamine and 1 mole of phosphorus pentoxide heated to a temperature of about 400° C., which said product is associated with a phenolic resin to the extent of 3% to 90% by weight of the said heat-reaction product.

5. An insulating material comprising glass fibers rendered glow-proof by the dispersion thereon of a phenolic resin associated with the insoluble, heat-reaction product of 2 to 4 moles melamine and 1 mole of phosphorus pentoxide heated to a temperature of about 400° C., said heat-reaction product being present to the extent of 3% to 90% by weight in said material.

6. A composition of matter comprising an otherwise glow-susceptible phenolic resin, which resin has been rendered glowproof by the addition thereto of from 3% to 90% by weight of the reaction product of 3 moles of melamine and 1 mole of phosphorus pentoxide heated to a temperature of about 400° C.

7. A phenolic resin having associated therewith the heat-reaction product of 3 moles of melamine and 1 mole of phosphorus pentoxide heated to a temperature of about 400° C.

MORRIS L. NIELSEN.
HOWARD K. NASON.

REFERENCES CITED

The following references are of record in the file of this patent:

UNITED STATES PATENTS

| Number | Name | Date |
|---|---|---|
| 2,464,342 | Pollak | Mar. 15, 1949 |